(12) United States Patent
Wang et al.

(10) Patent No.: US 10,803,260 B2
(45) Date of Patent: Oct. 13, 2020

(54) QR CODE GRAPHIC MANUFACTURING DEVICE AND MANUFACTURING METHOD OF THE SAME

(71) Applicant: NATIONAL TAIWAN NORMAL UNIVERSITY, Taipei (TW)

(72) Inventors: Hsi-Chun Wang, Taipei (TW); Chun-Shien Lu, Taipei (TW); Jia-Chi Ho, Taipei (TW); Shan-Hua Yeh, Taipei (TW); Yu-Mei Wang, Taipei (TW); Chia-Tsen Sun, Taipei (TW); Pei-Chun Kuan, Taipei (TW)

(73) Assignee: NATIONAL TAIWAN NORMAL UNIVERSITY, Taipei (TW)

(*) Notice: Subject to any disclaimer, the term of this patent is extended or adjusted under 35 U.S.C. 154(b) by 72 days.

(21) Appl. No.: 15/790,005

(22) Filed: Oct. 22, 2017

(65) Prior Publication Data
US 2019/0026504 A1    Jan. 24, 2019

(30) Foreign Application Priority Data

Jul. 24, 2017  (TW) .............................. 106124788 A

(51) Int. Cl.
*G06K 9/36* (2006.01)
*G06K 9/38* (2006.01)
(Continued)

(52) U.S. Cl.
CPC .............. *G06K 1/121* (2013.01); *B41M 3/00* (2013.01); *G06K 19/06037* (2013.01); *G06K 19/06103* (2013.01)

(58) Field of Classification Search
CPC ............. G06K 1/121; G06K 19/06037; G06K 19/06103; G06K 1/123; G06K 19/06056; B41M 3/00
See application file for complete search history.

(56) References Cited

U.S. PATENT DOCUMENTS 8,550,352 B2 * 10/2013 Guo ................... G06K 7/10851
                                                        235/462.1
9,016,571 B2    4/2015 Lee et al.
(Continued)

FOREIGN PATENT DOCUMENTS

CN    103942762 A    7/2014
TW    200604966 A    2/2006

OTHER PUBLICATIONS

1. Fu, Ming Sun et al. "Data Hiding Watermarking for Halftone Images" IEEE Transaction on Image Processing, vol. 11, No. 4, Apr. 2002, pp. 477-484.*
(Continued)

*Primary Examiner* — Samir A Ahmed
(74) *Attorney, Agent, or Firm* — Mark M. Friedman

(57) ABSTRACT

The present disclosure provides a QR code graphic manufacturing device, which comprises a gray-scaled adjusting module, a data-hiding module, and an error-diffusion module. The gray-scaled adjusting module is used to adjust a gray-scaled value of an original image to generate a modified gray-scaled image. The data-hiding module and the error-diffusion module are respectively used to process the modified gray-scaled image and a QR code, and to generate a QR code graphic with a better hidden effect.

4 Claims, 5 Drawing Sheets

(51) Int. Cl.
*G06K 1/12* (2006.01)
*B41M 3/00* (2006.01)
*G06K 19/06* (2006.01)

(56) References Cited

U.S. PATENT DOCUMENTS

| | | | | |
|---|---|---|---|---|
| 9,390,358 | B1* | 7/2016 | Cheung | G06K 19/06103 |
| 9,760,820 | B2* | 9/2017 | Lin | G06K 19/06037 |
| 2002/0028027 | A1* | 3/2002 | Koyama | G06F 17/145 |
| | | | | 382/289 |
| 2010/0238514 | A1* | 9/2010 | Ishii | H04N 1/32133 |
| | | | | 358/3.28 |
| 2013/0221105 | A1* | 8/2013 | Cheong | G06K 19/06037 |
| | | | | 235/469 |
| 2013/0301870 | A1* | 11/2013 | Mow | G06T 1/0021 |
| | | | | 382/100 |
| 2015/0324946 | A1* | 11/2015 | Arce | G06T 1/0021 |
| | | | | 382/251 |
| 2016/0028920 | A1* | 1/2016 | Hashimoto | H04N 1/405 |
| | | | | 358/534 |
| 2016/0205442 | A1* | 7/2016 | Yee | G06Q 30/02 |
| | | | | 725/34 |
| 2016/0308932 | A1* | 10/2016 | Gibbons | H04M 1/2755 |
| 2016/0371854 | A1* | 12/2016 | Gershon | G06K 9/6202 |
| 2017/0185880 | A1* | 6/2017 | Lin | G06K 19/06037 |
| 2017/0200289 | A1* | 7/2017 | Gershon | G06T 7/90 |
| 2017/0262994 | A1* | 9/2017 | Kudriashov | G06K 9/00281 |

OTHER PUBLICATIONS

Duda, Jarek, "Embedding grayscale halftone pictures in QR Codes using Correction Trees", Jagiellonian University, Cracow, Poland, Dec. 2, 2012, pp. 1-16, Nov. 2013, pp. 217-1 to217-8.*
Chu, Hung-Kuo et al., "Halftone QR Codes", ACM Transactions on Graphics.32. 6.Article 217.*
Garateguy, G.J. et al., "QR Images: Optimized Image Embedding in QR Codes", IEEE Transactions on Image Processing, vol. 23, No. 7, Jul. 2014, pp. 2842-2853.*
Qiao, S. et al. ,"Structure-aware QR Code abstraction ", The Visual Computer, 2015, pp. 1123-1133.*
"Graphic QR code and value-added application to personalized stamp", Printing Science & Technology, 33 (2), Jun. 1, 2017, p. 79-89, HO, Jia-chi, WANG, Hsi-chun. Full text.

* cited by examiner

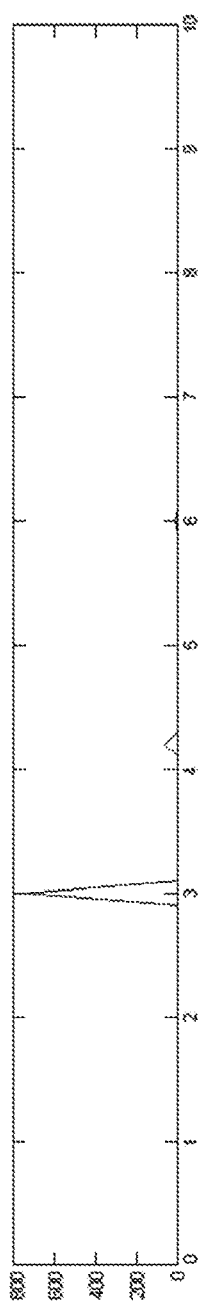
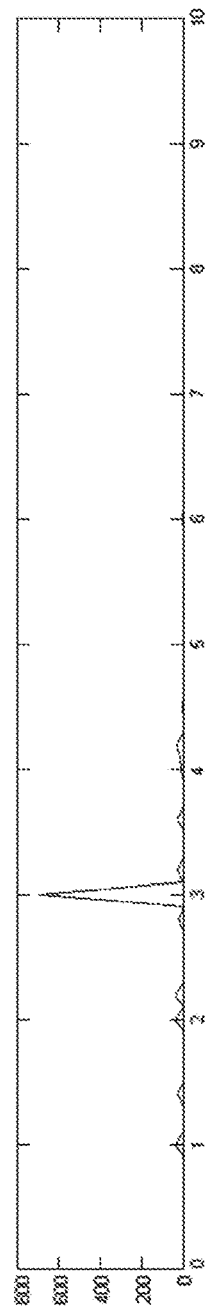
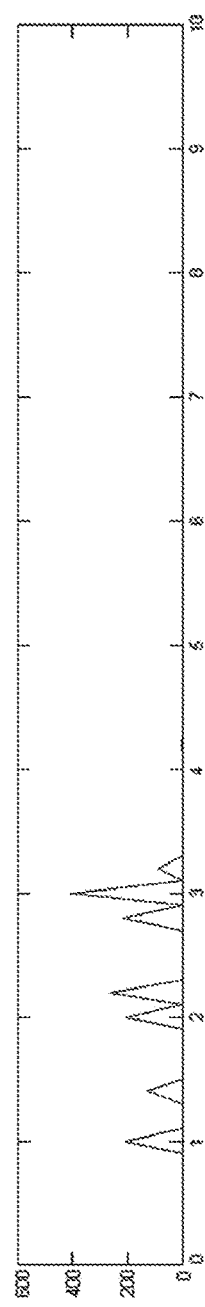
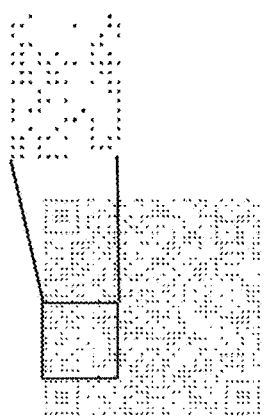
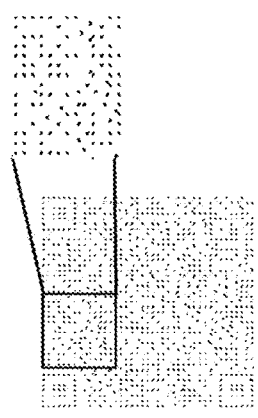
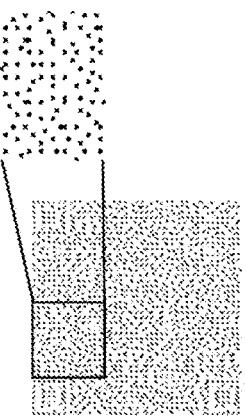
FIG. 4A
FIG. 4B
FIG. 4C

QR CODE GRAPHIC MANUFACTURING DEVICE AND MANUFACTURING METHOD OF THE SAME

CROSS-REFERENCE TO RELATED APPLICATIONS

This application claims the priority benefit of Taiwan Application No. 106124788, filed on Jul. 24, 2017. This application was disclosed at an exhibition entitled "World Stamp Championship Exhibition" on Oct. 21-26, 2016, and is hereby incorporated by reference for all purposes as fully set forth herein.

FIELD OF DISCLOSURE

The present disclosure relates to a field of image processing, and more particularly to a quick response (QR) code graphic manufacturing device and manufacturing method of same.

DESCRIPTION OF PRIOR ART

In existing quick response (QR) code graphics, although an image is clearly identifiable, a residual pattern of an original coded QR code still remains. In particular, when there are areas that are too bright (gray-scaled value close to 255) or areas that are too dark (gray-scaled value close to 0) in the original image, the original image will display in a form of a QR code graphic in a neat arrangement after binarization. In other words, actual state of the image is a "white spot" or "black spot," so that the naked eye can clearly identify the neat arrangement, and people can obviously know that it is a QR code graphic.

Hence, it is necessary to provide a graphic manufacturing device, a QR code graphic manufacturing device, and a manufacturing method for a QR code graphic which are able to solve the above technical issue.

SUMMARY OF THE DISCLOSURE

In order to solve the above-mentioned issue of the conventional art, an object of the present disclosure is to solve the technical issue of "residual black and white spots in the quick response (QR) code" which exists in the existing QR code for the dark and bright areas of the original image. With a gray-scaled adjusting module to modify the gray-scaled value of an original image, thereby solving the issue of the neat arrangement of the "residual black and white spots in the QR code".

In order to complete the above object, the present disclosure provides a QR code graphic manufacturing device, which comprises a gray-scaled adjusting module, a data-hiding module, and an error-diffusion module.

The gray-scaled adjusting module is used for generating a modified gray-scaled image by adjusting a gray-scaled value of an original image. The data-hiding module is used for performing a data-hiding process on the modified gray-scaled image and a QR code. The error-diffusion module is used for performing an error-diffusion process on the modified gray-scaled image and the QR code. A QR code graphic is generated after performing the data-hiding process and the error-diffusion process on the modified gray-scaled image and the QR code.

In a preferred embodiment, the gray-scaled adjusting module generates the modified gray-scaled image with a gray-scaled transformation formula, and the gray-scaled transformation formula comprises:

When G is less than or equal to C, G'=C;
When G is greater than C and less than (255−C), G'=G;
When G is greater than or equal to (255−C); G'=(255−C);

G is a gray-scaled value of each pixel of the original image, C is a pre-determined gray-scaled value, and G' is a gray-scaled value of each pixel of the modified gray-scaled image. Furthermore, in order to show a better image-toning, a smoothing process is done at the inflection point on a curve.

In a preferred embodiment, the QR code graphic manufacturing device further comprises a masking-effect calculation module for calculating a nearest distance diagram of each pixel of the QR code graphic and a plurality of spots surrounding the each pixel, and determining whether an original peak of the nearest distance diagram is greater than other peaks of the nearest distance diagram. When the original peak of the nearest distance diagram is larger than the other peaks of the nearest distance diagram, the pre-determined gray-scaled value is changed to make the gray-scaled adjusting module to adjust the original image again.

In order to complete the above object, the present disclosure further provides a manufacturing method for a QR code graphic, which comprises:

First, a modified gray-scaled image is generated with a gray-scaled adjusting module by adjusting a gray-scaled value of an original image. Then, a data-hiding process on the modified gray-scaled image and a QR code is performed with a data-hiding module. Then, an error-diffusion process on the modified gray-scaled image and the QR code is performed with an error-diffusion module, to generate a QR code graphic.

In a preferred embodiment, the gray-scaled adjusting module generates the modified gray-scaled image with a gray-scaled transformation formula, and the gray-scaled transformation formula comprises:

When G is less than or equal to C, G'=C;
When G is greater than C and less than (255−C), G'=G;
When G is greater than or equal to (255−C); G'=(255−C);

G is a gray-scaled value of each pixel of the original image, C is a pre-determined gray-scaled value, and G' is a gray-scaled value of each pixel of the modified gray-scaled image. Furthermore, in order to show a better image-toning, a smoothing process is done at the inflection point on a curve.

In a preferred embodiment, the manufacturing method for a QR code graphic further comprises:

First, a nearest distance diagram of each pixel of the QR code graphic and a plurality of spots that surrounds the each pixel is calculated, and it is determined whether an original peak of the nearest distance diagram is greater than other peaks of the nearest distance diagram with a masking-effect calculation module. Then, the pre-determined gray-scaled value is changed to make the gray-scaled adjusting module to adjust the original image again, when the original peak of the nearest distance diagram is larger than the other peaks of the nearest distance diagram.

Compared with the conventional art, the present disclosure uses a gray-scaled adjusting module to adjust the gray-scaled value of the original image, to solve the poor appearance issue caused by the neat "residual black and white spots in the QR code".

BRIEF DESCRIPTION OF THE DRAWINGS

FIG. 4A is a nearest distance diagram of each pixel of the QR code graphic and a plurality of spots that surround each pixel, when the pre-determined gray-scaled value is zero.

FIG. 4B is a nearest distance diagram of each pixel of the QR code graphic and a plurality of spots that surround each pixel, when the pre-determined gray-scaled value is 16.

FIG. 4C is a nearest distance diagram of each pixel of the QR code graphic and a plurality of spots that surround each pixel, when the pre-determined gray-scaled value is 26.

DETAILED DESCRIPTION OF THE PREFERRED EMBODIMENTS

The following description of the embodiments references the drawings, illustrating specific embodiments in which the disclosure may be practiced. The terms of the present invention, such as "up", "down", "front", "post", "left", "right", "inside", "outside", and "side" are merely the directions of the drawings. Thus, the directional language used is for the purpose of illustrating and understanding the disclosure and is not intended to limit of the invention.

Figure 1:
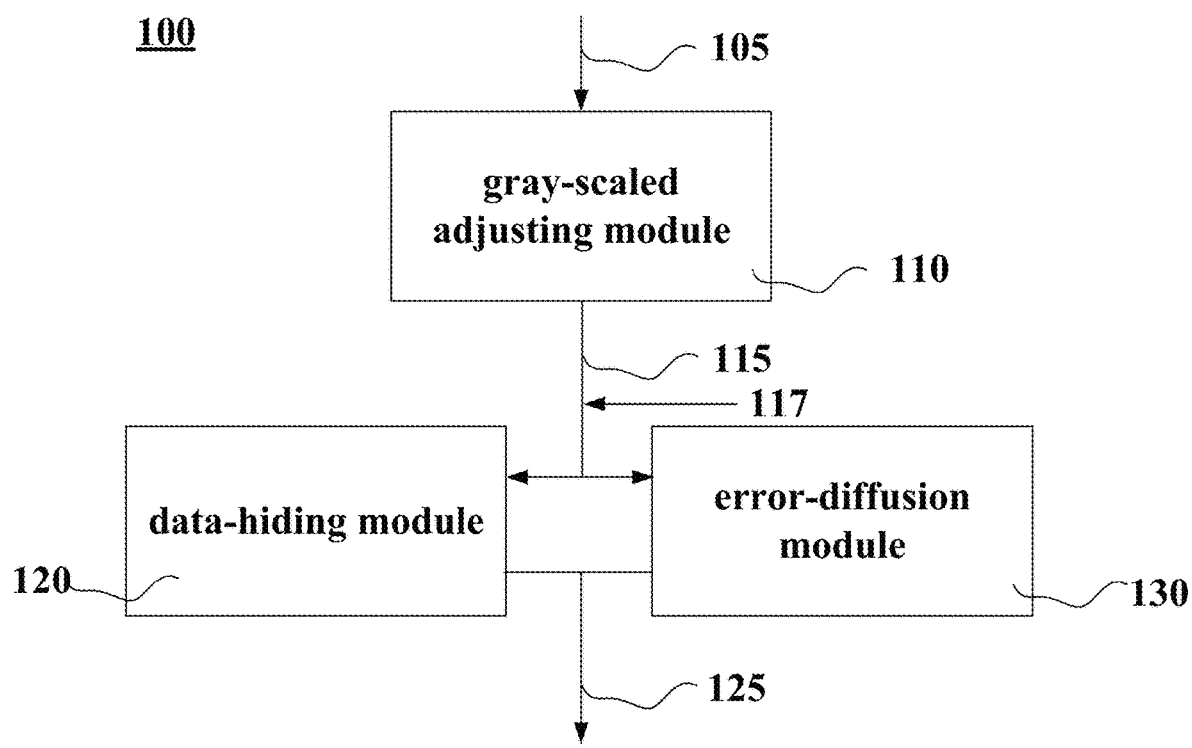
FIG. 1 is an illustrative diagram of a QR code graphic manufacturing device of a first embodiment according to the present disclosure.

FIG. 1 is an illustrative diagram of a QR code graphic manufacturing device 100 of a first embodiment according to the present disclosure. The QR code graphic manufacturing device 100 comprises a gray-scaled adjusting module 110, a data-hiding module 120, and an error-diffusion module 130. The gray-scaled adjusting module 110 is used for generating a modified gray-scaled image 115 by adjusting a gray-scaled value of an original image 105. In detail, the gray-scaled adjusting module 110 generates the modified gray-scaled image 115 with a gray-scaled transformation formula, the gray-scaled transformation formula is as below:

When G is less than or equal to C, G'=C;
When G is greater than C and less than (255−C), G'=G;
When G is greater than or equal to (255−C); G'=(255−C);

G is a gray-scaled value of each pixel of the original image, C is a pre-determined gray-scaled value, and G' is a gray-scaled value of each pixel of the modified gray-scaled image. It is necessary to select different C according to different original image 105. Furthermore, in order to show better image-toning, a smoothing process is done at the inflection point on a curve.

The data-hiding module 120 is used for performing a data-hiding process on the modified gray-scaled image 115 and a QR code 117. The error-diffusion module 130 is used for performing an error-diffusion process on the modified gray-scaled image 115 and the QR code 117. A QR code graphic 125 is generated after performing the data-hiding process and the error-diffusion process on the modified gray-scaled image 115 and the QR code 117. In detail, the data-hiding module 120 and the error-diffusion module 130 simultaneously perform the data-hiding process and the error-diffusion process on the modified gray-scaled image 115 and the QR code 117.

The data-hiding and error-diffusion process are refer to hiding techniques of a series of "digital watermark embedding techniques for embedding half-tone images" proposed by O. S. Fu and O. C. Au, in 2002. Among these, Data Hiding Error Diffusion (DHED) and Modified Data Hiding Error Diffusion (MDHED) are used to determine whether each pixel of the image being processed is at a position of data-hiding, when the image is performed with the data-hiding method and error-diffusion method. When the pixel's position of the information to be hidden is 1 ("yes"), the pixel is designated as 1, whereas when the pixel's position of the information to be hidden is 0 ("no"), the pixel is designated as 0, then, the error generated when data-hiding and the error of screening is undertaken by the neighboring pixels, meanwhile, the hiding of the information is completed when the image is screened. It should be noted that, when the image is converted into the QR code graphic 125, each pixel is a white spot or a black spot; there is no gray-scaled pixel.

Figure 2A:
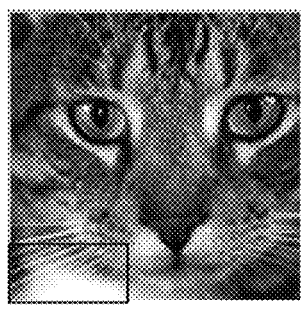
FIG. 2A is an original image before operation of the first embodiment according to the present disclosure.
Figure 2B:
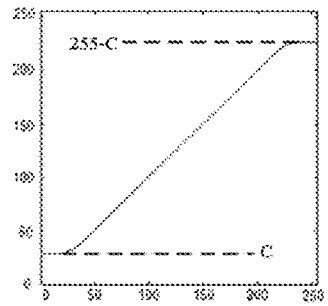
FIG. 2B illustrates a gray-scaled transformation formula.
Figure 2C:
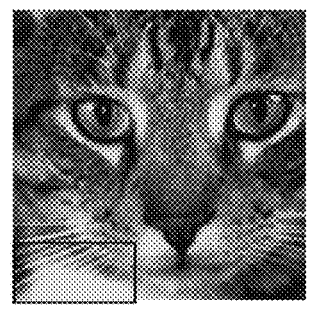
FIG. 2C is a modified gray-scaled image after operation of the first embodiment according to the present disclosure.
Figure 2D:
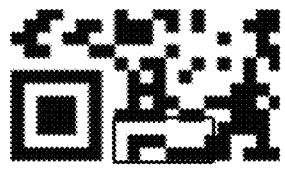
FIG. 2D is a partial diagram of a bright area of a QR code graphic which will be added.
Figure 2E:
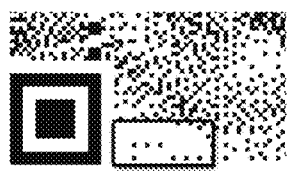
FIG. 2E is a partial diagram of a bright area of a QR code graphic before a gray-scale adjusting operation of the first embodiment according to the present disclosure.
Figure 2F:
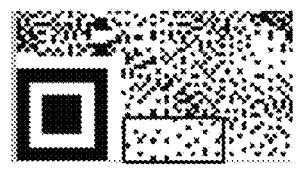
FIG. 2F is a partial diagram of a bright area of a QR code graphic after a gray-scale adjusting operation of the first embodiment according to the present disclosure.

FIG. 2A is an original image 105 before operation of the first embodiment according to the present disclosure. FIG. 2B illustrates a gray-scaled transformation formula. FIG. 2C is a modified gray-scaled image 115 after operation of the first embodiment according to the present disclosure. The X-axis of the gray-scaled transformation formula is an input gray-scaled value, and the Y-axis is an output gray-scaled value. In the present disclosure, the original gray-scaled value G is the input gray-scaled value, and the modified gray-scaled value G' is the output gray-scaled value. For example, with the white block at the lower left corner of the original image 105 and the modified gray-scaled image 115, after the transformation of the gray-scaled transformation formula, it is apparent that the modified gray-scaled image 115 is slightly grayed. The reason is that the pre-determined gray-scaled value C and (255−C) of the gray-scaled transformation formula is about 30 and 225, so that the gray-valued of the bright pixel of the portion of the original image 105 exceeding 225 is gradually modified to 225, so the lower left corner of the modified gray-scaled image 115 becomes slightly gray. In a partial diagram of a bright area after the QR code is embedded, the QR code graphic of FIG. 2E formed by the original gray-scaled image has a neat arrangement of "residual black and white spots in the QR code", which is not appealing to see. However, in a partial diagram of a bright area of a QR code graphic after a gray-scale adjusting operation, the neat "residual black and white spots in the QR code" has been effectively masked to be much more appealing to see. It is not easy to perceive the presence of the black and white spots in the QR code.

Figure 3:
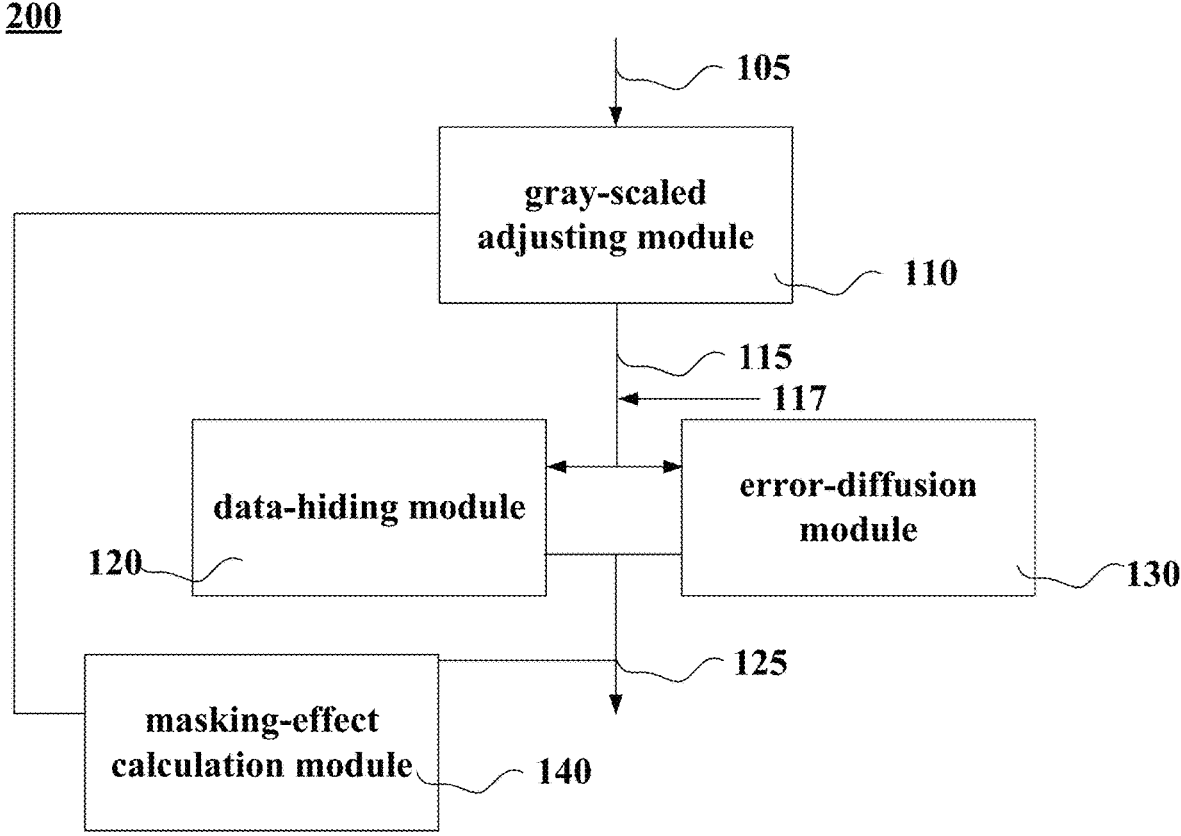
FIG. 3 is an illustrative diagram of a QR code graphic manufacturing device of a second embodiment according to the present disclosure.

Please refer to FIGS. 3, 4A, 4B, and 4C. FIG. 3 is an illustrative diagram of a QR code graphic manufacturing device 200 of a second embodiment according to the present disclosure. FIG. 4A is a nearest distance diagram of each pixel of the QR code graphic 125 and a plurality of spots that surround each pixel, when the pre-determined gray-scaled value is zero. FIG. 4B is a nearest distance diagram of each pixel of the QR code graphic 125 and a plurality of spots that surround each pixel, when the pre-determined gray-scaled value is 16. FIG. 4C is a nearest distance diagram of each pixel of the QR code graphic 125 and a plurality of spots that surround each pixel, when the pre-determined gray-scaled value is 26.

The difference between the present preferred embodiment and the first preferred embodiment is the present preferred embodiment adds a masking-effect calculation module 140 for calculating a nearest distance diagram of each pixel of the QR code graphic 125 and a plurality of spots that surround each pixel, and determining whether an original peak of the nearest distance diagram is greater than other peaks of the nearest distance diagram.

The function of the nearest distance diagram is to analyze the relationship of the nearest distance between each pixel and a plurality of pixels that surround each pixel. The unit of the X-axis is a pixel (that is, the nearest distance between a pixel and the plurality of pixels that surround the pixel), and the Y-axis is the cumulative number of times of the nearest distance between each pixel and the plurality of pixels that surround each pixel.

In the preferred embodiment, the original peak of the nearest distance diagram is defined as the cumulative number of the position of the highest point in the nearest distance diagram each pixel and the plurality of spots that surround each pixel before the gray-scaled adjustment. Take FIG. 4A for example, the peak of the pixel is 3 pixels, and the neat arrangement of the black pixels is clearly seen on the basis of the partial enlarged diagram of the QR code graphic 125. Then, with reference with FIG. 4B, when the pre-determined gray-scaled value is changed to 16, although the peak of the pixel is still 3 pixels, other peaks are shown between 1 pixel to 4 pixels and the arrangement of the black pixels is apparently more random than the arrangement of FIG. 4A on the basis of the partial enlarged diagram of the QR code graphic 125, the arrangement rule is not easily seen. Furthermore, with reference with FIG. 4C, when the pre-determined gray-scaled value is changed to 26, although the peaks of the pixel is 1-3 pixels, the arrangement of the black pixels is apparently less neat than the arrangement of FIG. 4B on the basis of the partial enlarged diagram of the QR code graphic 125.

Hence, according to the above description, it is known that "residual black and white spots in the QR code graphic 125" are less easily perceived by the naked eye and the visual beauty is improved, depending on changing the pre-determined gray-scaled value C.

In detail, in the preferred embodiment, when the pre-determined gray-scaled value C is equal to 26, the naked eye is hardly able to distinguish the neat arrangement therein. In other words, when the pre-determined gray-scaled value C is equal to 26, the production of the QR code graphic 125 is finished. However, it is also possible to change the setting for the pre-determined gray-scaled value and the peak according to the different requirements.

Figure 5:
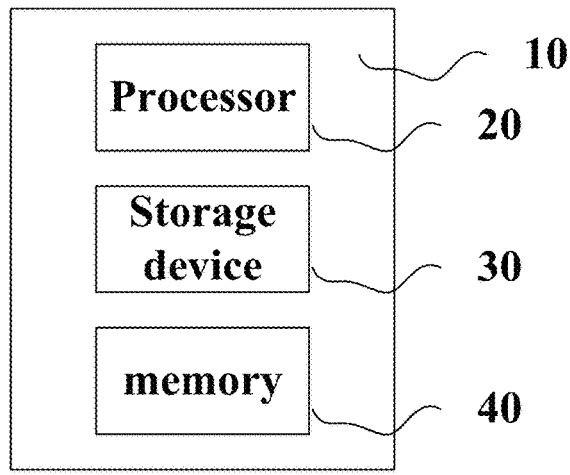
FIG. 5 is an illustrative diagram of a computer.

FIG. 5 is an illustrative diagram of a computer. The computer 10 includes a processor 20, a storage device 30, and a memory 40. The actual results of the image processing of the QR code manufacturing devices 100 and 200 of the present disclosure can be realized by the operation of the computer 10. The computer 10 is included in the QR code graphic manufacturing devices 100, 200.

It is to be noted that the computer 10 may also be other electronic devices having a processor, a storage device, and a memory.

For instance, the memory 40 is configured to store computer readable program codes and the processor 20 is configured to execute the computer readable program codes to perform operations as mentioned above.

Figure 6:
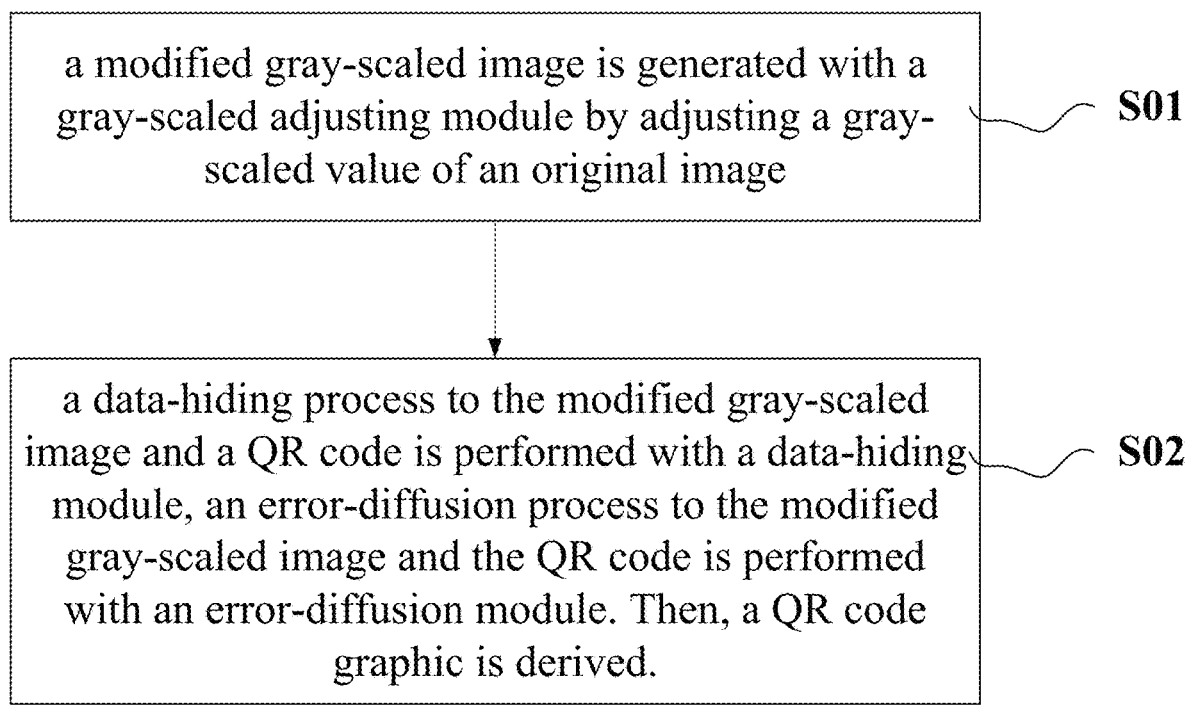
FIG. 6 is a flow diagram of a QR code graphic manufacturing method of a first preferred embodiment according to the present disclosure.

FIG. 6 is a flow diagram of a QR code graphic manufacturing method of a first preferred embodiment according to the present disclosure. Please refer to FIG. 1 for the components used in the QR code manufacturing method. First, step S01, a modified gray-scaled image 115 is generated with a gray-scaled adjusting module 110 by adjusting a gray-scaled value of an original image 105. Then, step S02, a data-hiding process to the modified gray-scaled image 115 and a QR code 117 is performed with a data-hiding module 120, an error-diffusion process to the modified gray-scaled image 115 and the QR code 117 is performed with an error-diffusion module 130. Then, a QR code graphic 125 is derived.

Figure 7:
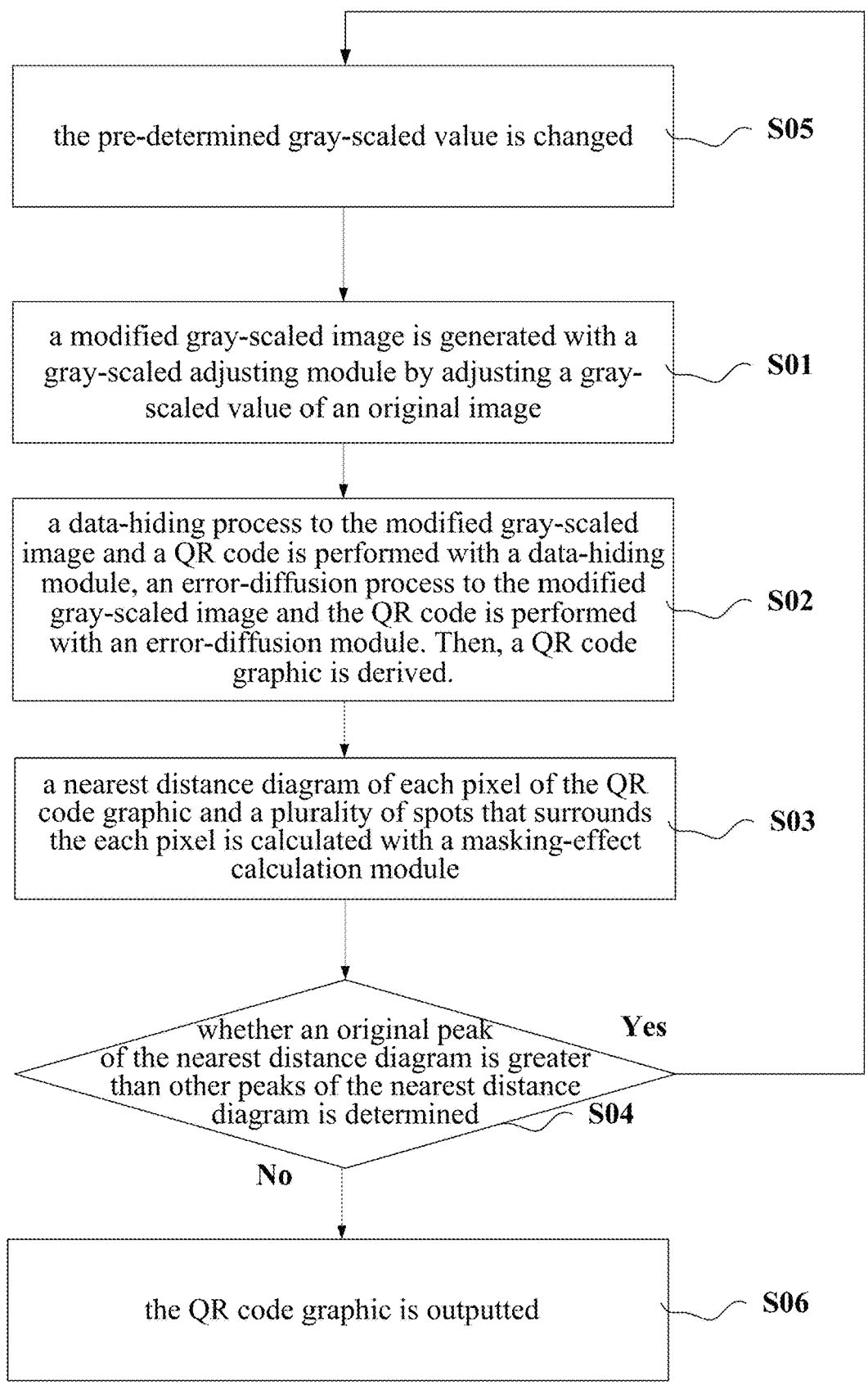
FIG. 7 is a flow diagram of a QR code graphic manufacturing method of a second preferred embodiment according to the present disclosure.

FIG. 7 is a flow diagram of a QR code graphic manufacturing method of a second preferred embodiment according to the present disclosure. Please refer to FIG. 3 for the components used in the QR code manufacturing method. The difference between the QR code graphic manufacturing method of the preferred embodiment and the QR code graphic manufacturing method of the first preferred embodiment is: steps S03-S06 are added after the step S02. Step S03, a nearest distance diagram of each pixel of the QR code graphic 125 and a plurality of spots that surround each pixel is calculated with a masking-effect calculation module 140. Then, step S04, it is determined whether an original peak of the nearest distance diagram is greater than other peaks of the nearest distance diagram. Then, step S05, the pre-determined gray-scaled value C is changed. Then, step S01 is performed again. If the original peak of the nearest distance diagram is not greater than other peaks of the nearest distance diagram, then step S06, the QR code graphic 125 is outputted.

The above are only preferred embodiments of the present disclosure and are not to be construed as limiting the present disclosure. Any modifications, equivalent substitutions, improvements, and the like within the spirit and principle of the present disclosure should be included in the protection range of the present disclosure.

What is claimed is:

1. A device for manufacturing a quick response (QR) code graphic, comprising:
    a memory configured to store computer readable program codes; and
    a processor configured to execute the computer readable program codes to perform the following operations:
        generating a modified gray-scaled image by adjusting a gray-scaled value of an original image with a gray-scaled transformation formula;
        performing a data-hiding process to the modified gray-scaled image and a QR code; and
        performing an error-diffusion process to the modified gray-scaled image and the QR code, to generate the QR code graphic;
    wherein the gray-scaled transformation formula comprises:
        when G is less than or equal to C, G'=C;
        when G is greater than C and less than (255−C), G'=G;
        when G is greater than or equal to (255−C); G'=(255−C);
    wherein G is a gray-scaled value of each pixel of the original image, C is a pre-determined gray-scaled value greater than 0, and G' is a gray-scaled value of each pixel of the modified gray-scaled image.

2. The device according to claim 1, wherein the processor is further configured to execute the computer readable program codes to perform the following operations: calculating a nearest distance diagram of each pixel of the QR code graphic and a plurality of spots that surround each pixel, and determining whether an original peak of the nearest distance diagram is greater than other peaks of the nearest distance diagram, wherein when the original peak of the nearest distance diagram is larger than the other peaks of the nearest distance diagram, the pre-determined gray-scaled value is changed to adjust the original image again.

3. A method for manufacturing a quick response (QR) code graphic, comprising:
   generating a modified gray-scaled image by adjusting a gray-scaled value of an original image with a gray-scaled transformation formula; and
   performing a data-hiding process to the modified gray-scaled image and a QR code and performing an error-diffusion process to the modified gray-scaled image and the QR code, to generate the QR code graphic;
   wherein the gray-scaled transformation formula comprises:
   when G is less than or equal to C, G'=C;
   when G is greater than C and less than (255−C), G'=G;
   when G is greater than or equal to (255−C); G'=(255−C);
   wherein G is a gray-scaled value of each pixel of the original image, C is a pre-determined gray-scaled value greater than 0, and G' is a gray-scaled value of each pixel of the modified gray-scaled image.

4. The manufacturing method for the QR code graphic according to claim 3, further comprising:
   calculating a nearest distance diagram of each pixel of the QR code graphic and a plurality of spots that surround each pixel and determining whether an original peak of the nearest distance diagram is greater than other peaks of the nearest distance diagram;
   changing the pre-determined gray-scaled value to adjust the original image again, when the original peak of the nearest distance diagram is larger than the other peaks of the nearest distance diagram.

\* \* \* \* \*